UNITED STATES PATENT OFFICE.

KARL SCHWICKERATH, OF BONN, GERMANY.

PROCESS OF MAKING A PROTEOSE PREPARATION.

No. 860,414.　　　　　Specification of Letters Patent.　　　　Patented July 16, 1907.

Application filed October 30, 1906. Serial No. 341,244.

*To all whom it may concern:*

Be it known that I, KARL SCHWICKERATH, a subject of the German Emperor, and residing at Bonn-on-the-Rhine, Germany, have invented new and useful Improvements in Processes of Making a Proteose Preparation, of which the following is a specification.

My invention has for its object a process for the manufacture of a proteose preparation from the flesh of fish which is soluble in water and should possess no fishy taste or smell.

If albumen be subjected to the action of superheated steam it is, as is well known, converted into proteoses (albumoses and peptones). If fish-albumen for instance flesh from fish be treated in the same manner a liquid is obtained which has a very disagreeable fishy smell and taste.

The object of the present process consists in destroying and removing these. I have observed that if that liquid be treated with a sufficient quantity of a solution of a permanganate salt (permanganate of potassium or sodium or calcium) the bad smelling products are changed and enter partly into combination with the manganese hydroxid formed by the decomposition of the permanganate, so that those manganese compounds can be removed from the liquid by simple filtration. The complete separation of that manganese precipitate takes place upon heating the liquid.

I will now give an example of the manner in which the process is carried out in practice. 50 kilos of flesh from fish are treated in an autoclave with superheated steam of a temperature of about 120°—130° C. for some time, say about two hours. The liquid portion of the contents is then separated from the solid matter. After cooling the liquid a dilute aqueous solution of 250 grammes of potassium or sodium or calcium permanganate is gradually and slowly added thereto, while the liquid is being kept stirred all the time. By such treatment the sulfur compounds formed in the first stage of the process are oxidized and the fatty acids made to combine with the manganese hydroxid to form insoluble compounds. Finally the liquid is heated until all the manganese compounds have been completely precipitated. The mass is then filtered, the clear filtrate evaporated and dried.

The quantity of the permanganate required to remove all smell and taste cannot be given exactly as this will vary depending on the nature of the fish employed.

Having now particularly described and ascertained the nature of my invention and in what manner the same is to be performed, I declare that what I claim is:—

A process of manufacturing a proteose preparation from fish consisting substantially in, first, treating fish-flesh with superheated steam to obtain a solution of proteoses; second, separating the solids from the solution, third, treating this solution with a permanganate solution for the purpose of oxidizing the sulfur compounds formed in the first stage of the process and making the fatty acids to combine with the manganese hydroxid to form insoluble compounds; fourth, separating the latter by heating and filtration and evaporating the filtrate to dryness.

In testimony whereof I have signed my name to this specification in the presence of two subscribing witnesses.

KARL SCHWICKERATH.

Witnesses:
　LUDWIG KASPERS,
　JOHN G. MEYER.